July 18, 1961

D. S. HEFFERN 2,992,662

UPRIGHT WIDE PANEL SAW

Filed Sept. 9, 1958

INVENTOR.
DICK S. HEFFERN
BY
AGENT

July 18, 1961  D. S. HEFFERN  2,992,662
UPRIGHT WIDE PANEL SAW
Filed Sept. 9, 1958  2 Sheets-Sheet 2
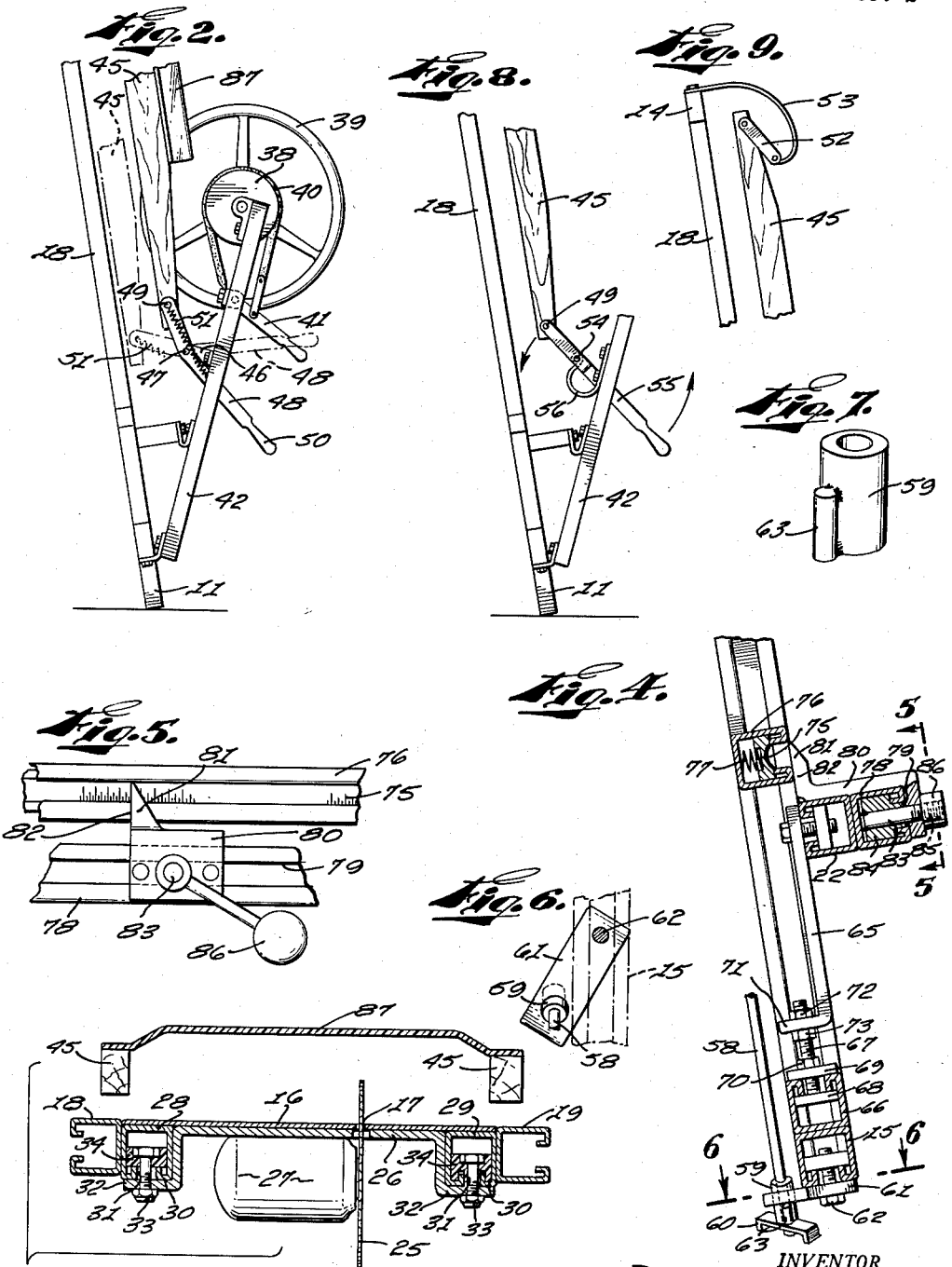
INVENTOR.
DICK S. HEFFERN
BY
AGENT

United States Patent Office 2,992,662
Patented July 18, 1961

2,992,662
UPRIGHT WIDE PANEL SAW
Dick S. Heffern, 626 N. West St., Anaheim, Calif.
Filed Sept. 9, 1958, Ser. No. 759,995
3 Claims. (Cl. 143—47)

My invention relates to panel saws and more particularly relates to improvements in upright panel saws designed to saw ply-wood panels and similar wide sheet structures. Reference is made to Patent No. 2,785,708, issued March 19, 1957 to Julius J. Krogen. While adhering to the principles of panel-saw construction set forth in said patent, it is an object of this invention to provide a panel-saw which is more easily and quickly adjustable, both as to truing the frame of the saw and in relation to a work-piece placed upon the frame.

A more specific object of my invention is to provide means for clamping a panel to the frame of the panel-saw which, while retaining parallelism of a clamping-bar to the panel, permits the clamping bar to have an infinite range of adjustment and not to be dependent upon a ratchet, the notches of which may or may not correspond to the thickness of a panel.

Another object of my invention is to provide a panel-saw having an adjustable ledge for supporting a panel, experience having shown that it is erroneous to assume that the panel edge resting upon the ledge will always be true and normal to the intended cut.

A further object of my invention is to provide a practically dust-proof carriage and track for the movement of the saw in a panel-saw.

Still another object of my invention is to provide measuring means in connection with a panel-saw which are protected from saw-dust and may be operated with speed and precision.

Another object of my invention is to provide rapid and accessible adjustment means for squaring the frame of a panel-saw.

In the accompanying drawings, illustrative of my improved panel-saw but not intended to be limiting thereof.

FIG. 2 is a fragmentary view partly in section on the line 2—2 of FIG. 1, showing windlass means for operating the saw and preferred clamping means for clamping a panel to the saw-frame;

FIG. 3 is a horizontal sectional view on the line 3—3 of FIG. 1 and on an enlarged scale, showing the carriage and track carrying the saw and the motor therefor;

FIG. 4 is a vertical sectional view on the line 4—4 of FIG. 1, and on the scale of FIG. 3, showing the mounting of measuring means and of means for squaring the frame of the panel-saw;

FIG. 5 is a fragmentary frontal view as indicated by the line 5—5 of FIG. 4, showing the aforesaid measuring means;

FIG. 6 is a horizontal sectional view on the line 6—6 of FIG. 4, showing details of the means for squaring the frame;

FIG. 7 is a further enlarged detail of a slide joint of the squaring means;

FIG. 8 shows a modification of the clamping means shown in FIG. 2; and

FIG. 9 shows the arrangement at the upper end of the clamping means for maintaining the clamping means parallel with the frame of the saw.

Figure 1:
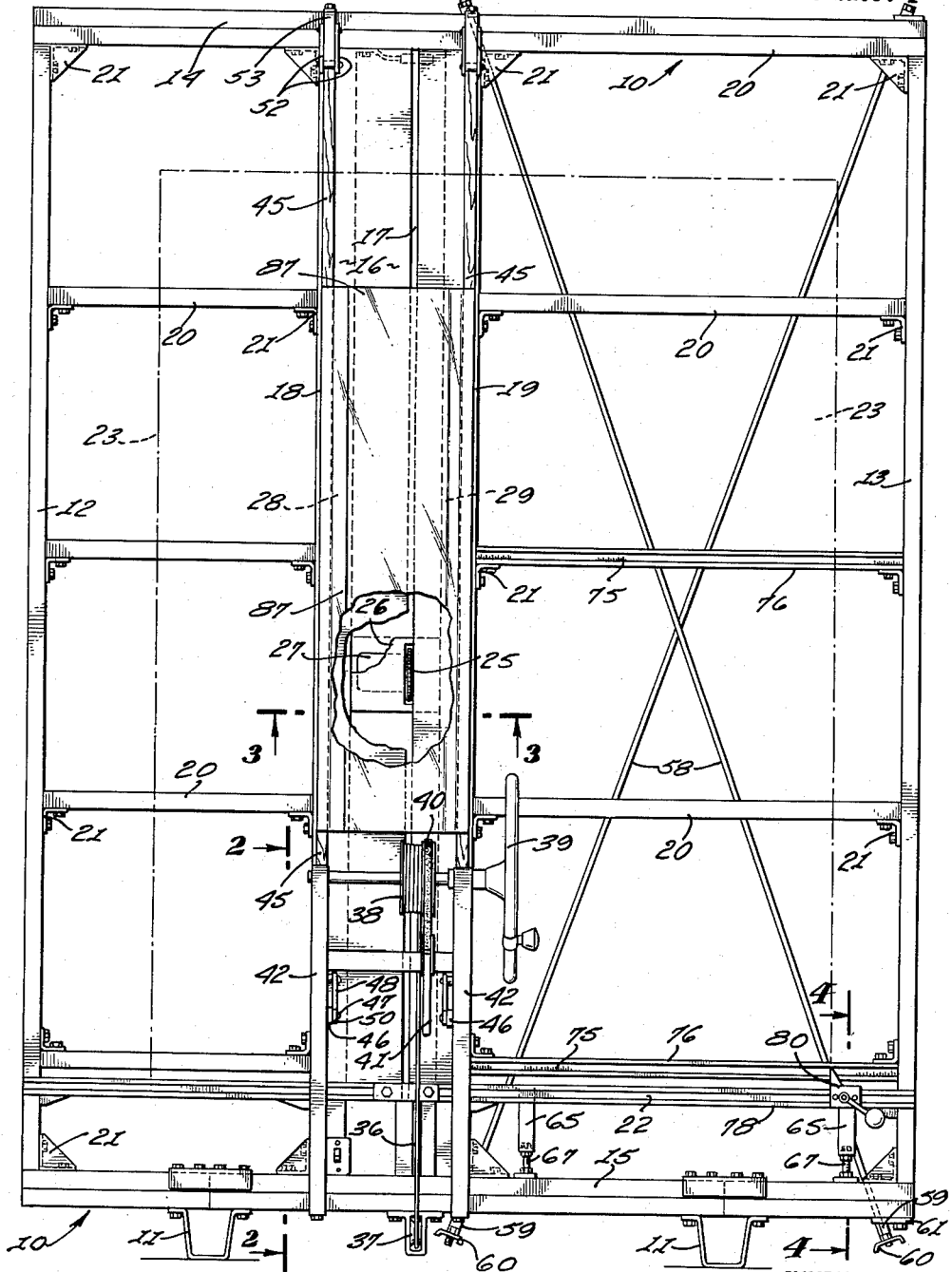
FIG. 1 is a frontal elevational view of my saw.

Having reference to the details of the drawings, a frame 10, mounted on feet 11, has vertical members 12 and 13, and top and bottom members 14 and 15. A split panel 16, having a slot 17, extends between the members 14 and 15, and has vertical members 18 and 19 at its sides. The members 18 and 19 are connected to the members 12 and 13 by horizontal braces 20 and suitable corner brackets 21. It will be noted that the horizontal braces 20 do not cross the panel 16 except at the top and the bottom of the frame. Across the lower portion of the frame 10 is a ledge 22, for supporting a panel of plywood or similar work-piece, shown in a broken line at 23 in FIG. 1. The slot 17 intersects the ledge 22.

A rotary saw 25, carried by a carriage 26 and driven by a motor 27, is mounted behind the panel 16 with saw-blade extending through the slot 17. Supported and braced by the vertical members 18 and 19 and by the panel 16 are tracks 28 and 29, rectangular in structure. In the faces 30 of the tracks 28 and 29 outstanding rearwardly from the frame 10, and therefor protected to a great extent both by distance and direction of opening from the entry of sawdust, are lengthwise openings 31. The sides 32 of the carriage 26 extend rearwardly and then sideways so as to lie across the openings 31, and are provided with bolts 33 entering the openings 31 and there engaging slides 34 in a manner to hold the carriage 26 in tight sliding engagement with the tracks 28 and 29. When the frame 10 is placed in a leaning position against a wall, the tracks 28 and 29, being on the back of the frame will be inclined with the openings 31 facing slightly downward. Passage of the carriage ends 32 along the tracks will wipe the tracks clear of sawdust, and the sawdust will fall clear of the tracks and none will enter the openings 31, or only such a minimum as to be negligible.

The saw 25 and its carriage 26 and motor 27 are operated by a cable 36 which is attached to the carriage and extends around a pulley 37 at the foot of the frame 10 and up to a windlass drum 38. The drum 38 is turned by a hand-wheel 39, and is controlled by a brake-band 40, tightened by a hand-lever 41. The drum 38, hand-wheel 39, brake-band 40 and lever 41 are mounted on brackets 42, outstanding from the vertical members 18 and 19 of the panel 16. The drum 38 serves to pull the saw 25 downwardly through the work; another cable and counterweight, not shown, but more fully described in Patent No. 2,785,708, serves to lift the saw again; and the brake-band 40 controls the rate of lift or holds the saw at any desired point.

A work-piece panel 23 is held upon the ledge 22 against the frame 10 by clamp bars 45. The clamp bars 45 are so mounted with linkage at both ends that they swing parallel to the frame 10 and panel 16, and thereby clamp with their full length instead of only at points. To effectuate this full-length clamping in a manner that permits clamping a work-piece of any thickness, the linkage of the clamp bars in now spring-actuated.

In the preferred embodiment, shown in FIG. 2, a plate 46 is secured to one of the brackets 42. To the plate 46, at a fulcrum 47 there is secured a lever 48, one end of which is pivotally secured to the clamp bar at 49, and the other end of which is fitted with a handle 50. A spring 51 connects the pivot point 49 to the bracket 42 below the plate 46. As shown in dotted line in FIG. 2, movement of the handle 50 upwardly causes the spring 51 to cross over that part of the lever 48 between the pivot point 49 and the fulcrum point 47 and then to pull the clamp bar down and toward the panel 16. Conversely, when by pushing the handle 50 downward the spring 51 is moved to the outer side of the fulcrum point 47, the spring then urges the clamp bar 45 away from the panel 16.

At the top of the panel 16, the clamp bars 45 are connected by links 52 to springs 53 (FIG. 9). It will be seen that when the clamp bar 45 is pulled downward and toward the work, to clamp the work, the link 52 will push outward upon the spring 53, which of course will resist and will push the upper end of the clamp bar against the work. The entire length of the clamp bar 45 is thus made effective.

In FIG. 8, I have shown a modification of the spring structure shown in FIG. 2. In this form of my invention the fulcrum point 54 of the lever 55 is at the end of a curved spring 56. As the lever handle is pulled upward from the position illustrated, the pivot point 49 swings downward, and when the clamp bar encounters the work-piece, it will compress the spring 56 outwardly toward the bracket 42. It will again be noted that if the action of the spring is considered as on a line passing through the fulcrum point 54 and normal to the bracket 42, the working end of the lever between the points 49 and 54 is in one instance on one side of the line of spring resistance and in the other instance on the opposite side of that line, the lever in this modified form crossing the line of spring resistance instead of the spring crossing the lever, but the well-known principle of an over-center spring action holding true in both instances.

With a workpiece placed upon the ledge 22 against the frame 10, it becomes incumbent upon the operator to make certain, before clamping it, that it is properly lined up with the saw and that the portion to be cut off is properly measured. For the purpose of squaring the frame 10 to the saw-tracks 28 and 29, diagonal cross bars 58 are provided. These bars may be secured in any suitable manner to the top of the frame, and are adjustable at the bottom of the frame where the adjusting mechanism is convenient to the operator. This form of mechanism has been found to be more convenient than turn-buckles mid-way of the cross-bars 58, which are often unavailable when covered by a work-piece.

The diagonal bars 58 pass through bushings 59 and are threaded at their ends to receive wing-nuts 60. The bushings 59 are rotatably fitted into plates 61, secured by bolts 62 to the bottom frame member 15. At the side of each of the bushings 59 is a lug 63 which holds the respective bushing from being pulled upward through the frame member 15. The structure permits the diagonal bars 58 to be adjustably anchored without tending to bend them.

A very important adjustment is to square the ledge 22 with the saw-tracks 28 and 29 or even to incline the ledge at a small angle to the tracks. In joining plywood panels it will often be found necessary to fit a panel edge to some other edge not squarely cut, and a great deal of time in assembling and fitting can be saved by a simple adjustment of the ledge 22. For the purpose of adjusting the ledge 22, there depend from the ledge 22 a pair of short legs 65, the hollow feet 66 of which are secured to the bottom frame member 15, as by welding. Between the legs 65 and the feet 66 are threaded connections (FIG. 4), comprising bolts 67 respective to the feet 66, each bolt 67 having a head 68 within the foot 66 and a washer 69 secured by a nut 70 outside the foot 66, thereby stabilizing the position of the bolt 67 with respect to the foot 66. The bolt 67 extends above the nut 70 and passes through a lug 71 at the base of the leg 65. Nuts 72 and 73, above and below the lug 71 on the bolt 67 enable the ledge 22 to be posited with micrometer precision with respect to the base member 15, and by varied positions on the two legs 65 they permit the ledge to be tilted, to vary the position of a work-piece panel with respect to the saw-tracks 28 and 29.

A constant difficulty with panel saws of this type has been that rules, markers, and indicia of distances were constantly being obscured by saw-dust, and that tracks for blocks and stops, intended to register with the indicia, also became fouled with dust. I have provided a concave rule 75, housed in a channel 76, and secured to the frame 10 immediately above the ledge 22. The concave rule 75 is urged towards the open face of the channel 76 by springs 77. While the channel 76 will ordinarily keep saw-dust from depositing on the concave face of the rule 75, the concave face itself assists in this desired result, and the springs 77 allow the rule to be pressed back and removed for cleaning, should that become desirable. Attached to the ledge 22 is another channel 78 having a narrow forwardly-facing opening 79. A measuring stop 80 rides upon the outer and upper surfaces of the channel 78, having an index finger 81 which registers with the indicia of the rule 75. The stop 80 has a face 82 aligned with the index finger 81, against which a work-piece on the ledge 22 may be pushed. A bolt 83 passes through the stop 80 and through the opening 79 of the channel 78 and there engages a block 84. The outer end of the bolt 83 has threads 85 to receive a handle 86. The handle 86 is weighted so as to turn upon the threads 86, and normally rests in a downwardly inclined position, as shown in FIG. 5, in which position it tightens the bolt 83 and block 84 against the flanges of the channel 78 on each side of the opening 79. When the handle 86 is lifted, the stop 80 may slide along the channel 78 to any desired registration with the rule 75, but is instantly stopped when the handle 86 is released and allowed to fall.

The clamp bars 45 are available for supporting a shield 87 which protects the saw 25. As the clamp bars 45 may be coextensive with the path of the saw 25, a shield mounted upon them may be made to protect the saw throughout its movements up and down. Preferably the shield 87 is of transparent material such as Plexiglas, allowing the saw to be viewed at all times. The shield 87 may be secured to both of the clamp bars 45, as a Plexiglas shield will have sufficient flexibility to accommodate itself to uneven operation of the clamp bar—and actually assists in their even operation—or it may be secured to only one clamp bar and still over-lay the path of the saw.

The disclosed embodiment is not be construed as a limitation upon the invention, the scope of which is deemed to include any desirable constructive modification within the spirit and breadth of the appended claims.

I claim:

1. In a panel saw: a frame; a ledge on said frame for supporting a work-piece; a clamp bar for clamping said work-piece against said frame; a lever connected to said clamp bar; a lever-support disposed outwardly from said frame; a fulcrum for said lever attached to said lever-support; and a spring connecting said lever and said lever support, that end of said lever connected to said clamp bar being arranged to swing from one over-center position with respect to said spring in which said spring urges said clamp bar against said work piece and said frame to an opposed over-center position in which said spring urges said clamp bar away from said work.

2. In a panel saw, the structure, set forth in claim 1 including a link and a second spring connecting said clamp bar to said frame at a position distant from said lever, said second spring increasing in tension as said clamp bar approaches said frame.

3. In a panel saw: a frame; a substantially vertical track supported by said frame; a saw mounted on said track for movement therealong; a ledge for holding a work piece in the path of said saw; a plurality of legs at spaced positions along said ledge for supporting said ledge upon said frame; bolts connected to each of said legs;

and means including members through which said bolts pass and a pair of nuts on each bolt, of which one nut is above the respective member and the other nut is below said member, for controlling the height of said ledge relative to said frame in both vertical directions.

References Cited in the file of this patent

UNITED STATES PATENTS

| | | |
|---|---|---|
| 1,566,225 | Mills | Dec. 15, 1925 |
| 1,981,992 | Curtis | Nov. 27, 1934 |
| 1,998,245 | Laukhuff | Apr. 16, 1935 |
| 2,262,569 | Wilcox | Nov. 11, 1941 |
| 2,518,728 | Snow | Aug. 15, 1950 |
| 2,592,970 | Starnes | Apr. 15, 1952 |
| 2,741,277 | Leger | Apr. 10, 1956 |
| 2,785,708 | Krogen | Mar. 19, 1957 |
| 2,789,595 | Peterson | Apr. 23, 1957 |